(12) United States Patent
Iwata et al.

(10) Patent No.: US 6,305,339 B1
(45) Date of Patent: Oct. 23, 2001

(54) BALANCE SHAFT FOR ENGINE BALANCING SYSTEMS

(75) Inventors: Kazuyuki Iwata; Keiko Yoshida, both of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/650,756

(22) Filed: Aug. 30, 2000

(30) Foreign Application Priority Data

Sep. 3, 1999 (JP) .................................................. 11-250619

(51) Int. Cl.[7] ...................................................... F02B 75/06
(52) U.S. Cl. ........................................... 123/192.2; 74/603
(58) Field of Search ............................. 123/192.2; 74/603

(56) References Cited

U.S. PATENT DOCUMENTS

| | | |
|---|---|---|
| 4,523,553 | 6/1985 | Backlund . |
| 4,703,724 | 11/1987 | Candea et al. . |
| 4,703,725 | 11/1987 | Weertman . |
| 5,253,547 | 10/1993 | Yoneyama et al. . |

FOREIGN PATENT DOCUMENTS

| | | |
|---|---|---|
| 0 243 683 | 5/1990 | (EP) . |
| 5-39233 | 10/1993 | (JP) . |

*Primary Examiner*—Noah P. Kamen
(74) *Attorney, Agent, or Firm*—Armstrong, Westerman, Hattori, McLeland & Naughton, LLP

(57) ABSTRACT

In a balance shaft for engine balancing systems for canceling an unbalance force of an engine, a journal portion of the balance shaft is provided with a recess on a side remote from the gravitational center of the counter weight, and a rib extends axially across this recess along a radial plane between full circular axial end portions of the journal portion to compensate for the reduction in the bending rigidity of the balance shaft due to the provision of the recess. The recess reduces the weight or mass of the balance shaft, and this recess does not diminish the performance of the bearing because the bearing load is essentially due to the unbalanced mass of the counter weight portion, and the recessed part of the bearing portion receives a significantly smaller part of the bearing load than the opposite side of the bearing portion. The recessing also contributes to increasing the eccentricity of the gravitational center of the associated part.

13 Claims, 8 Drawing Sheets

BALANCE SHAFT FOR ENGINE BALANCING SYSTEMS

TECHNICAL FIELD

The present invention relates to a balance shaft, and in particular to a balance shaft provided with a counter weight for canceling the unbalance force produced in reciprocating engines.

BACKGROUND OF THE INVENTION

Engine balancing devices are known. For instance, Japanese UM publication No. 5-39233 discloses a balancing device in which a pair of balance shafts each provided with a counter weight for canceling the unbalance force of the second order produced by pistons of an engine are disposed under the crankshaft in the oil pan, and the rotation of the crankshaft is transmitted to the balance shafts via a chain/sprocket mechanism or a gear mechanism. A similar balancing device is disclosed in U.S. Pat. Nos. 4,703,724 issued Nov. 3, 1987 to C. Candea et al. and 4,703,725 issued Nov. 3, 1987 to W. L. Weertman.

In such a balancing device, because the vibration control diminishes in effectiveness if the balance shafts deflect, the journal portion for rotatably supporting each balance shaft is desired to have as high a rigidity as possible. Therefore, the journal portion of a balance shaft generally consists of a solid structure having a fully circular cross section.

However, it is desired to minimize the overall weight of the balance shaft because of the increasing demand for the weight reduction of engines. Also, the balance shaft is required to have a certain unbalance mass. Therefore, the mass of the balance shaft is desired to be allocated to the unbalance mass as much as possible, and the mass which does not contribute to the generation of unbalance for canceling that of the engine, such as the mass found in the journal portion is desired to be minimized.

Such an effort to reduce the mass or weight of the various parts of a balance shaft should be implemented without compromising the required properties of the balance shaft such as the adequate bending rigidity and the load bearing capability of the journal.

Also, because the balance shaft is required to be installed in a relatively limited recess within the confine of an engine, it is important that the assembly of the various components of the balancing device can be executed in a simple manner.

BRIEF SUMMARY OF THE INVENTION

In view of such problems of the prior art, a primary object of the present invention is to provide an improved balance shaft which can minimize the size and overall weight of the counter weight without reducing the bending rigidity of the balance shaft.

A second object of the present invention is to provide a balance shaft which can minimize the weight of the balance shaft without sacrificing the load bearing capability of its journal portion.

A third object of the present invention is to provide a balance shaft which can minimize the weight of the balance shaft without unduly increasing the rotational resistance of its journal portion.

A fourth object of the present invention is to provide a balance shaft which is easy to assemble.

A fifth object of the present invention is to provide a balance shaft which is suited for compact design.

According to the present invention, such objects can be accomplished by providing a balance shaft for an engine balancing system for canceling an unbalance force of an engine, comprising: an counter weight portion having a gravitational center offset from a rotational center thereof; and a journal portion for rotatably supporting the balance shaft in a bearing bore defined in a fixed part of the engine; the journal portion being provided with a recess on a side remote from the gravitational center of the counter weight.

The recess reduces the weight or mass of the balance shaft, and this recess does not diminish the performance of the bearing because the bearing load is essentially due to the unbalanced mass of the counter weight portion, and the recessed part of the bearing portion receives a significantly smaller part of the bearing load than the opposite side of the bearing portion. The recessing also contributes to increasing the eccentricity of the gravitational center of the associated part. Typically, the journal portion is provided with a full circular part having a full circular cross section, preferably on each axial end thereof, to ensure the load bearing capability of the journal portion under all circumstances.

To compensate for any reduction in the bending rigidity of the balance shaft due to the recessing of a part of the bearing portion, the journal portion may be provided with a first rib extending across the recess axially along a radial plane between the full circular axial end portions of the journal portion.

The counter weight portion typically comprises a radially offset lobe. The rigidity of the balance shaft against bending can be significantly and easily improved by providing a second rib which extends axially along a radial plane on a side of the balance shaft diagonally opposite the lobe. It is particularly preferable if the the first and second ribs extend along a common radial plane and merge at one of the full circular axial end portions.

The first rib may be provided with an outer profile which is common to an outer profile of the full circular part of the journal portion. However, in view of reducing the resistance against rotation due to the deposition of lubricating oil in the recessed part of the journal portion may be provided with an outer profile which is recessed radially inward with respect to an outer profile of the full circular part of the journal portion. For the same reason, the outer profile of the first rib may be defined by a rounded edge. Additionally or alternatively, the first rib may be provided with an opening passed therethrough, preferably in a part of the rib adjacent to an axial center of the balance shaft.

In view of maximizing the reinforcing effect of the second rib, the second rib may extend substantially over an entire length of the counter weight portion. To reduce the weight of the rib without detracting from its reinforcing performance, the second rib may be provided with a radial height which progressively diminishes away from the journal portion.

Preferably, the journal portion has a substantially smaller rotational diameter than the counter weight portion. Thereby, the overall eccentricity of the balance shaft is maximized. In such a case, the housing for the balance shaft should consist of an upper and lower housing halves which jointly define a bearing bore for the journal portion so that the counter weight portion which is desired to have a relatively large rotational diameter is not required to be passed through the bearing bore for the balance shaft.

According to a particularly preferred embodiment of the present invention, the counter weight portion is provided on each axial end of the journal portion. Thus, the bending rigidity of the balance shaft against the unbalance force of the unbalance mass portions of the engine can be maximized for a given amount of the material for the balance shaft. Often, a pair of balance shafts rotating in opposite directions are required, and such a synchronizing motion may be accomplished by a gear such as a spur gear or helical gear attached to each balance shaft. To support such balance shafts in a stable fashion, each balance shaft may be provided with a gear attached thereto at a part adjacent to an end of one of the counter weight portion remote from the journal portion, and a second journal portion on an axial side of the gear remote from the counter weight portion.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
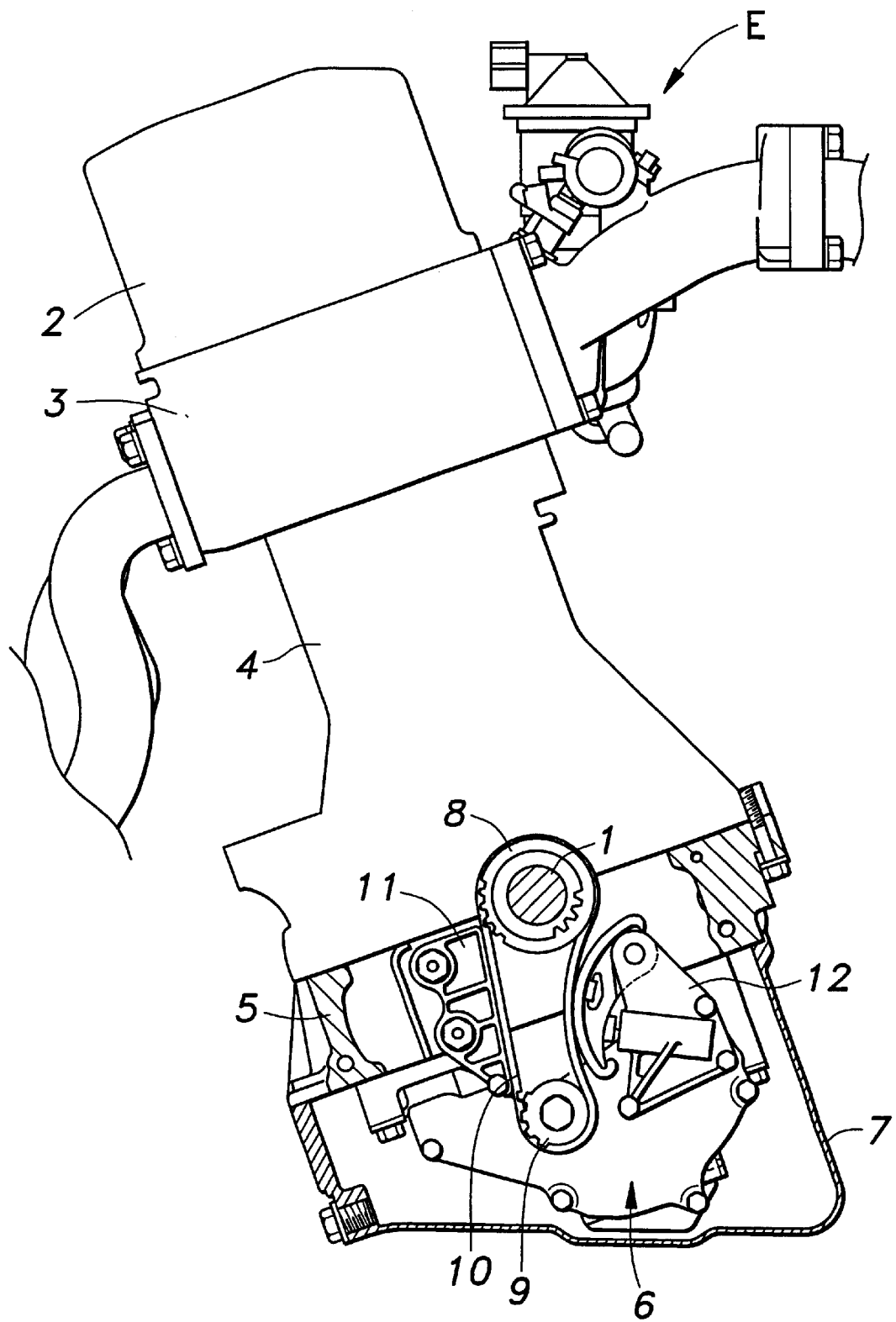
FIG. 1 is a broken away front view of an essential part of an engine incorporated with a balancing device embodying the present invention.

FIG. 1 shows a reciprocating piston engine embodying the present invention. This engine E consists of an inline four-cylinder engine having a crankshaft 1 extending in the horizontal direction, and comprises a head cover 2, a cylinder head 3, a cylinder block 4, a lower block 5, a balancing device 6 and an oil pan 7. The crankshaft 1 is rotatably supported by bearings defined in the interface between the lower surface of the cylinder block 4 and the upper surface of the lower block 5.

The balancing device 6 is designed to reduce the second-order vibration of the engine E resulting from the reciprocating motion of the pistons and other parts, and is attached by threaded bolts to the lower surface of the lower block 5 (under the crankshaft 1) fully enclosed in the oil pan 7. The rotation of the crankshaft 1 is transmitted to this balancing device 6 via a large sprocket 8 fixedly attached to the front end of the crankshaft 1 (the end adjacent to the crank pulley or the chain case is referred to as the front end in the following description), a small sprocket 9 fixedly attached to the front end of the balance shaft (which is described hereinafter) on the left hand side (the right and left is defined as such when the beholder faces the crank pulley or the chain case), and an endless link chain 10 passed around the large and small sprockets 8 and 9.

The endless link chain 10 is prevented from oscillating by a chain guide 11 fixedly attached to the front face of the lower block 5 at a point to the left of the center of the crankshaft 1, and is subjected to an appropriate tension at all times by a chain tensioner 12 which is fixedly attached to the front face of the balancing device 6 at a point immediately to the right of the small sprocket 9.

Figure 2:
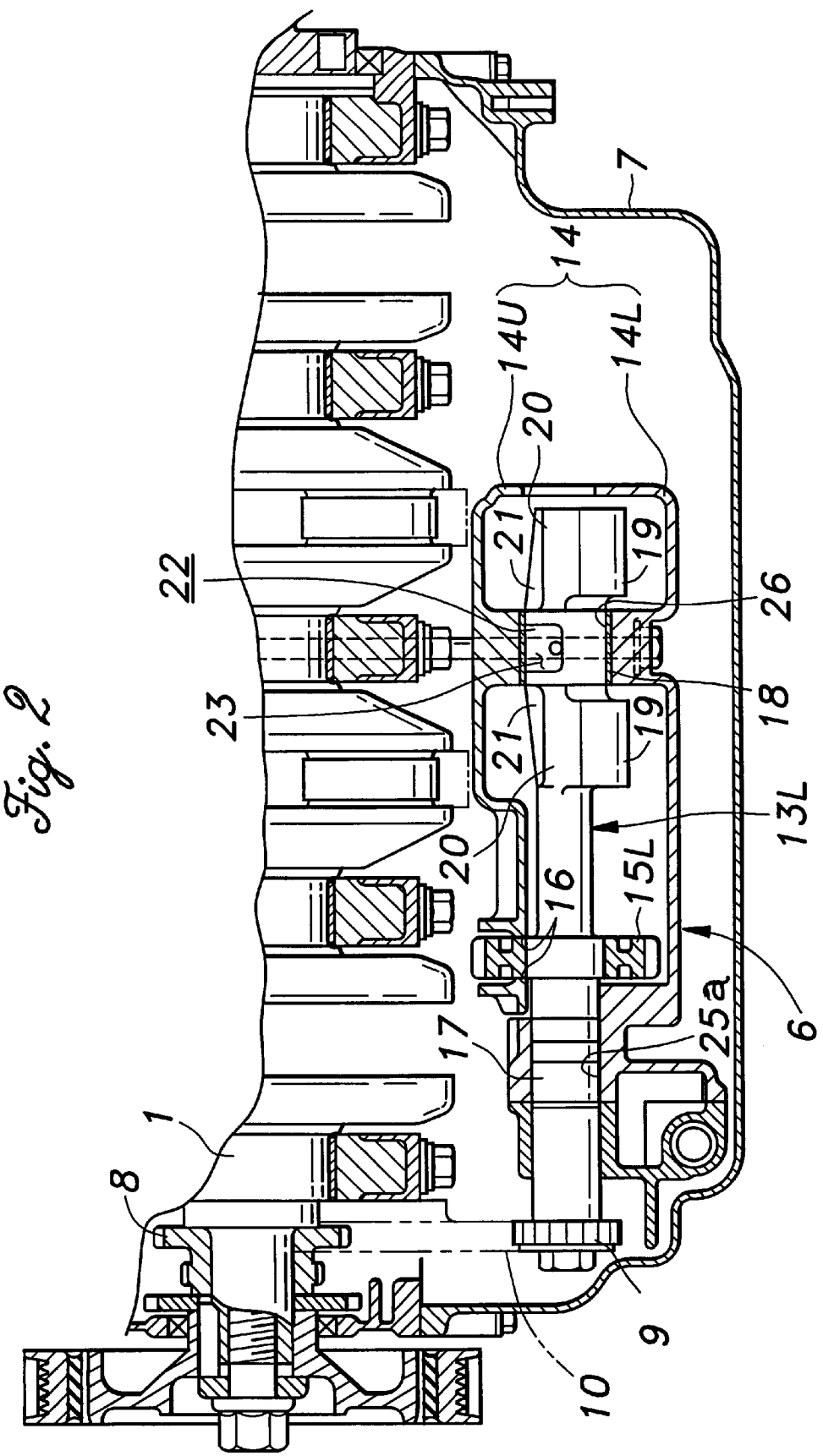
FIG. 2 is a fragmentary longitudinal sectional view taken along the axial center line of the left balance shaft to show the interior of the oil pan.
Figure 3:
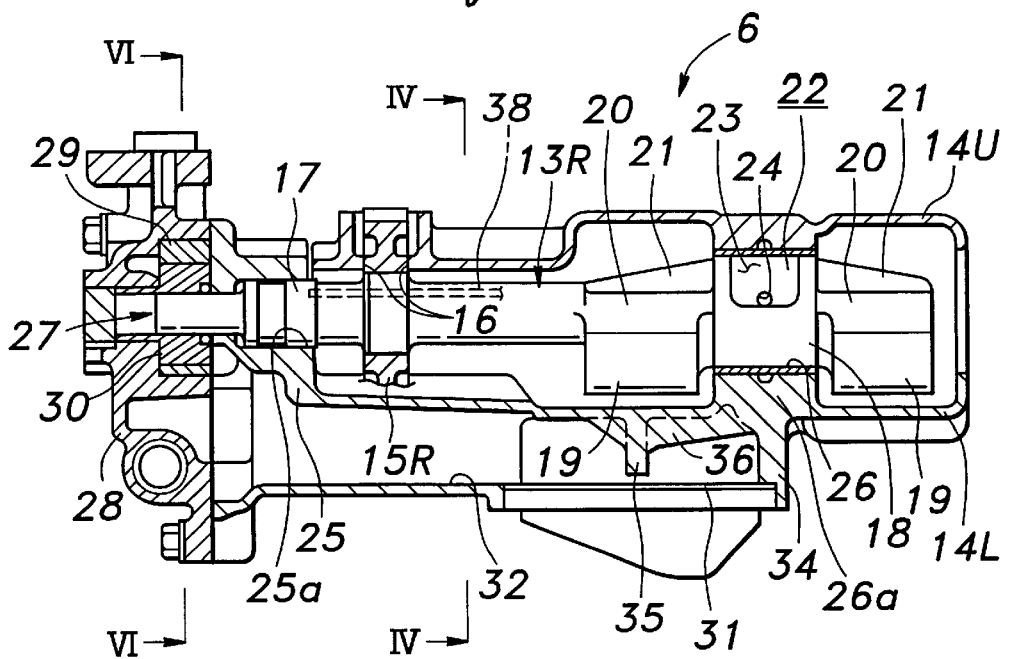
FIG. 3 is a longitudinal sectional view taken along the axial center line of the right balance shaft of the balancing device.
Figure 4:
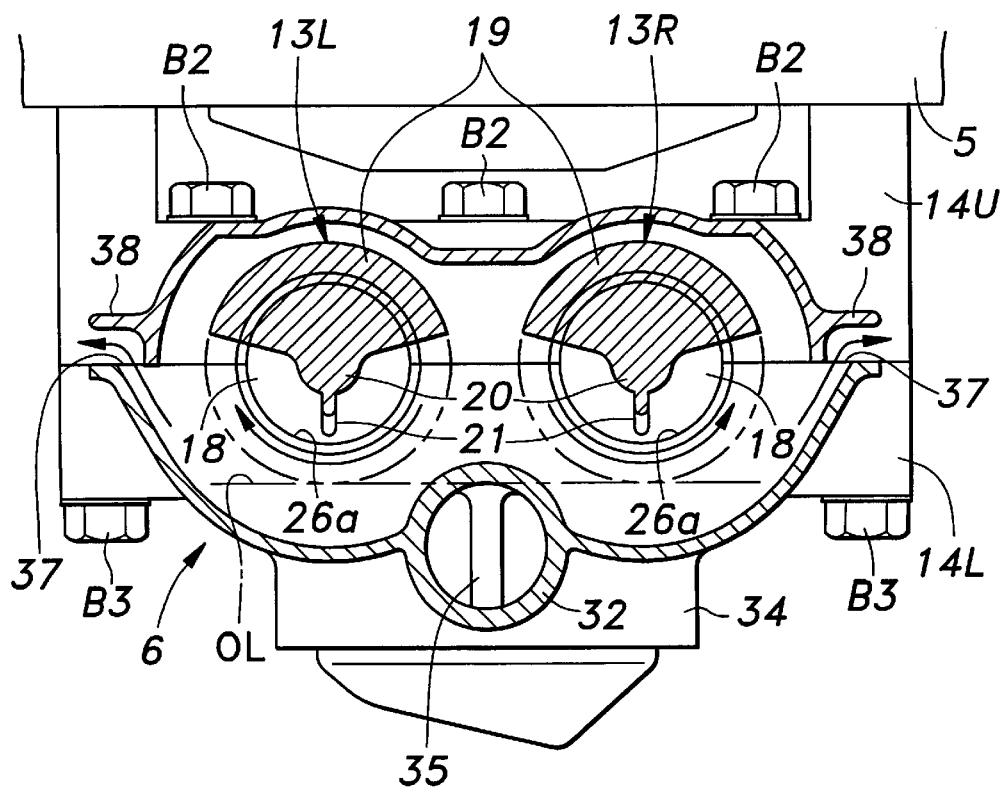
FIG. 4 is a longitudinal sectional view of an essential part taken along line IV—IV of FIG. 3.

As shown in FIGS. 2 to 4, the balancing device 6 comprises a pair of balance shafts 13L and 13R having a substantially identical shape, and an upper and lower halves 14U and 14L of a balancer housing 14 which are vertically separated from each other along a plane passing through the centers of the two balance shafts 13L and 13R.

The two balance shafts 13L and 13R are mutually synchronized by helical gears 15L and 15R which are integrally connected to the corresponding balance shafts 13L and 13R and mesh with each other. As mentioned earlier, the rotation of the crankshaft 1 is transmitted to the left balance shaft 13L via the large sprocket 8, the endless link chain 10 and the small sprocket 9. Therefore, the left balance shaft 13L is rotationally driven at twice the rotational speed of the crankshaft 1 and in the same direction as the crankshaft 1, and the right balance shaft 13R is rotationally driven in the opposite direction and at the same speed as the left balance shaft 13L by virtue of the meshing between the two helical gears 15L and 15R.

As shown in FIGS. 2 and 3, the parts of the upper half 14U of the balancer housing 14 corresponding to the helical gears 15L and 15R define thrust bearing wall portions 16 which engage the axial end surfaces of the helical gears 15L and 15R integral with the balance shafts 13L and 13R. These parts are open in their upper parts so that the outer periphery of each of the helical gears 15L and 15R is always exposed to the interior of the oil pan 7, and is therefore adequately lubricated by a supply of lubricating oil into the meshing part of the two helical gears 15L and 15R and the thrust bearing wall portions 16, the supply of lubricating oil being derived from that dripping from above or circulating inside the interior of the oil pan 7 in the form of oil mist.

Each of the balance shafts 13L and 13R is integrally provided with a first journal portion 18 having a relatively large diameter at a part near its rear end, and a second journal portion 17 having a relatively small diameter at its front end. Each of the balance shafts 13L and 13R is integrally provided with a pair of eccentric weights or counter weights 19 which are separated into two parts ahead and behind the first journal portion 18. These counter weights 19 have gravitational centers which are offset from the rotational center in the radial direction, and the diameter of the rotational trajectory of each of the counter weights 19 is larger than the diameter of the first journal portion 18 (see FIG. 4).

To achieve a required moment of inertia with counter weights of minimum size, each counter weight 19 is provided with a stem portion 20 which is reduced in diameter as compared to the remaining part of the balance shaft. To compensate for the reduction in rigidity due to the small diameter of the stem portion 20, tapering ribs 21 connecting to the corresponding axial ends of the first journal portions 18 are provided on the side of stem portions remote from the counter weight ahead and behind the first journal portion 18. These ribs 21 are each progressively reduced in height with the distance from the first journal portions.

Figure 5:
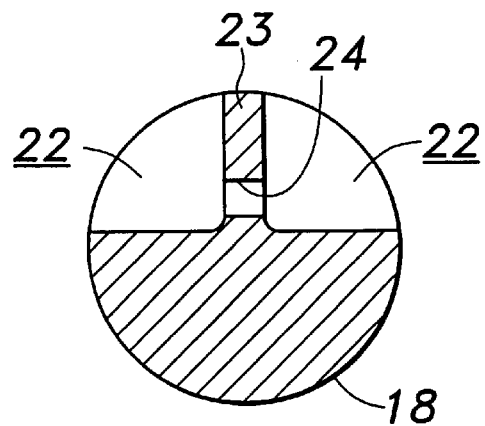
FIG. 5 is a sectional view taken along a plane perpendicular to the axial line of the first journal portion of one of the balance shafts.

To reduce the weight of the first journal portion 18 and offset the gravitational center of the first journal portion 18 from its axial center toward the counter weight 19 as much as possible to minimize the size of the counter weight 19, the side of the first journal portion 18 remote from the counter weights 19 is recessed so as to reduce weight except for the parts thereof adjacent to the two axial ends of the first journal portion 18. To compensate for the reduction in bending rigidity due to this recessing, a rib 23 extends across this space or recess 22 along a plane passing through the central axial line of the first journal portion 18 (see FIG. 5). The rib 21 formed in the stem portion 20 of the counter weight 19 and the rib 23 provided in the first journal portion 18 extend along a common plane.

Thus, because the axial ends of the first journal portion 18 on the side radially remote from the counter weights are engaged by the inner circumferential surface of the metal bearing as described hereinafter, even though the surface area of the part of the first journal portion 18 which is in contact with the bearing bore is somewhat reduced, there will be no break in the oil film, and the resistance to rotation can be adequately reduced.

A hole 24 is passed through a part of the rib 23 adjacent to the axial center to allow the lubricating oil to flow freely in the recess 22 and to prevent any increase in rotational resistance due to excessive deposition of oil within the recess 22.

In this embodiment, the recess 22 is defined by removing the material of the journal portion 18 approximately by one half or substantially along the diametric plane of the journal portion 18. However, the size and shape of the recess 22 can be freely selected depending on the condition of each application. For instance, the journal portion 18 may also be recessed by a recess which is substantially shallower and narrower. In any case, it is desirable for the journal portion 18 to have a full circular profile over at least 180 degrees so that the bearing capability against the unbalance force of the balance shaft may be ensured with a minimum outer diameter of the full circular profile of the journal portion.

The second journal portion 17 of each of the balance shafts 13L and 13R is supported by a bearing bore 25a defined in a second bearing wall portion 25 integrally provided in the front wall of the lower half 14L of the balancer housing 14. The first journal portion 18 of each of the balance shafts 13L and 13R is supported by a bearing bore 26a defined in a first bearing wall portion 26 consisting of two halves which are integrally formed with the upper and lower halves 14U and 14L of the balancer housing 14, respectively.

When installing the two balance shafts 13L and 13R within the balancer housing 14, the second journal portion 17 at the front end of each of the balance shafts 13L and 13R is first fitted into the bearing bore 25a defined in the second bearing wall portion 25 which is integral with the lower half 14L of the balancer housing 14, and the first journal portion 18 of each of the balance shafts 13L and 13R is placed on the lower half of the bearing bore 26a defined in the lower half of the first bearing wall portion 26 which is integral with the lower half 14L of the balancer housing 14. During this process, the counter weight portions 31 are required to be turned away from the lower half 14L of the balancer housing 14, in particular the lower half of the bearing bore 26a, so that the radially extending lobes of the counter weight portions 31 may not interfere with the lower half of the bearing bore 26a as the second bearing portion 17 is axially passed into the corresponding bearing bore 25a.

Thereafter, with the upper bearing half of the first bearing wall portion 26 on the side of the upper half 14U of the balancer housing 14 aligned with the first journal portion 18 of the corresponding one of the balance shafts 13L and 13R, the upper and lower housings 14U and 14L are put together. As a result, the two balance shafts 14u and 14L are rotatably retained between the two halves 14U and 14L of the balancer housing 14.

Thus, the counter weights 19 are not required to be passed through any of the bearing bores, and the diameters of the journal portions 18 and 19 can be reduced at will so long as the required mechanical strength is ensured. Therefore, the rotational resistance can be reduced, and the size and weight of the balancer housing 14 receiving the balance shafts 13L and 13R can be reduced to a level which has hitherto been impossible to achieve.

Figure 6:
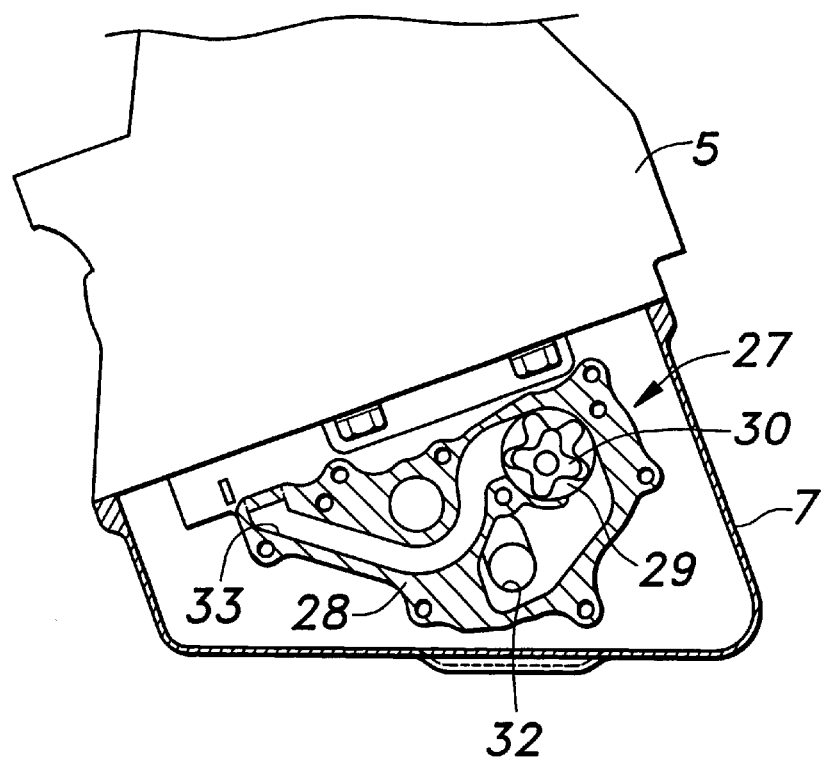
FIG. 6 is a longitudinal sectional view of an essential part taken along line VI—VI of FIG. 3.

The front end of the balancer housing 14 or the lower half 14L thereof is provided with a trochoid oil pump 27 for supplying lubricating oil to various parts of the engine as shown in FIG. 6 also. The trochoid oil pump 27 comprises a pump housing 28 attached to the front surface of the balancer housing 14 by threaded bolts, an outer rotor 29 received in the pump housing 28, and an inner rotor attached to the front end of the right balance shaft 13R. The inner rotor 30 which integrally rotates with the right balance shaft 13R cooperates with the outer rotor 29, and supplies the lubricating oil drawn from the oil pan 7 via an oil strainer 31 attached to the bottom wall of the lower half 14L of the balancer housing 14 and a suction tube 32 integrally formed with the bottom wall of the lower housing half 14L to various parts of the engine via an output oil passage 33 defined by the pump housing 28 and communicating with oil passages (not shown in the drawings) formed inside the cylinder block 4 and the lower block 5.

Referring to FIG. 3, the bottom wall of the lower half 14L of the balancer housing 14 is integrally formed with a mounting boss 34 for supporting the oil strainer 31 which is connected to the first bearing wall portion 26. The bottom wall of the lower half 14L of the balancer housing 14 is also integrally formed with a suction tube 32 which extends from the mounting boss 34 to an open front end which is adjacent to the second bearing wall portion 25 and closed by a part of the pump housing 28. The mounting boss 34 of the oil strainer 31 and the hollow suction tube 32 are integrally formed in the bottom wall of the housing lower half 14L in series and in continuation so that the bearing wall portions 25 and 26 of the housing lower half 14L supporting the front and rear ends of the balance shafts 13L and 13R are joined by the mounting boss 34 of the oil strainer 31 and the suction tube 32, and this contributes to the increase in the rigidity of the bearing wall portions 25 and 26.

A part of the suction tube 32 is located within the recess defined between the two balance shafts 13L and 13R (see FIG. 4) so that the downward protrusion of the suction tube 32 can be minimized. Also, because the oil strainer 31 is directly attached to the bottom wall of the housing lower half 14L, the size of the balancer housing 14 can be minimized, and this contributes to the compact design of the engine.

The mounting boss 34 is internally provided with a pin-shaped projection 35 extending from the housing lower half 14L to control the inward deformation of the oil strainer 31 which essentially consists of metal mesh. The projection 35 is also connected to the inner circumferential surface of the oil strainer mounting boss 34 with a rib 36. This rib 36 increases the rigidity of the oil strainer mounting boss 34, in particular the bearing half of the bearing wall portion 26.

The lateral side ends of the parting plane between the upper half 14U and the lower half 14L of the balancer housing 14 are each offset in the radial direction with respect to the corresponding balance shaft 13L or 13R as shown in FIG. 4. In the illustrated embodiment, the lower half 14L extends sideways further the upper half U. This offset creates an upwardly opening gap 37 defined along a plane passing through the axial center of the corresponding balance shaft 13L or 13R on each side. The lubricating oil OL stored in the bottom of the balancer housing 14 is thrown upward by the counter weights 19 as the two balance shafts 13L and 13R rotate (in the direction indicated by arrows), and expelled out of the balancer housing 14 from these gaps 37.

Figure 7:
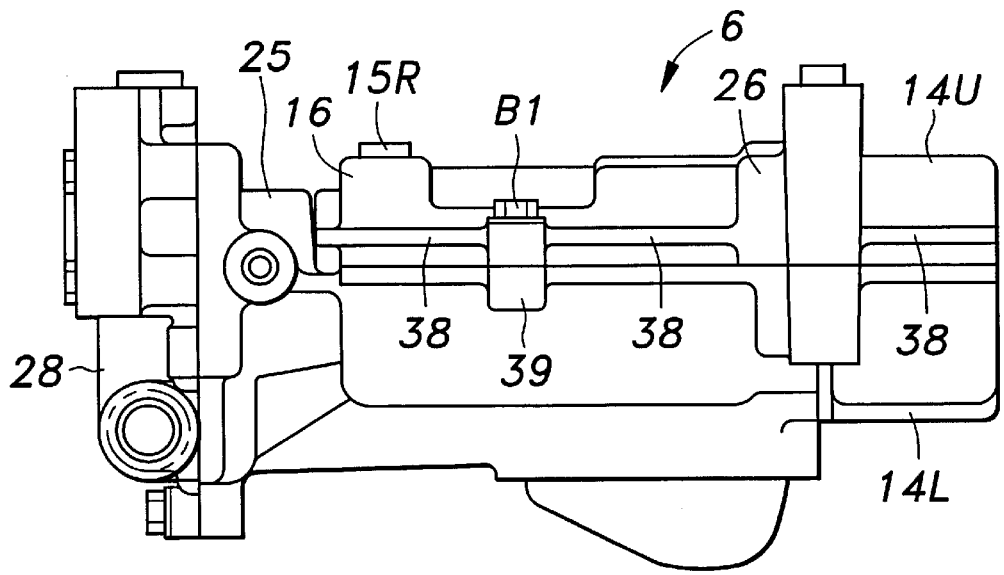
FIG. 7 is a right side view of the balancing device.
Figure 8:
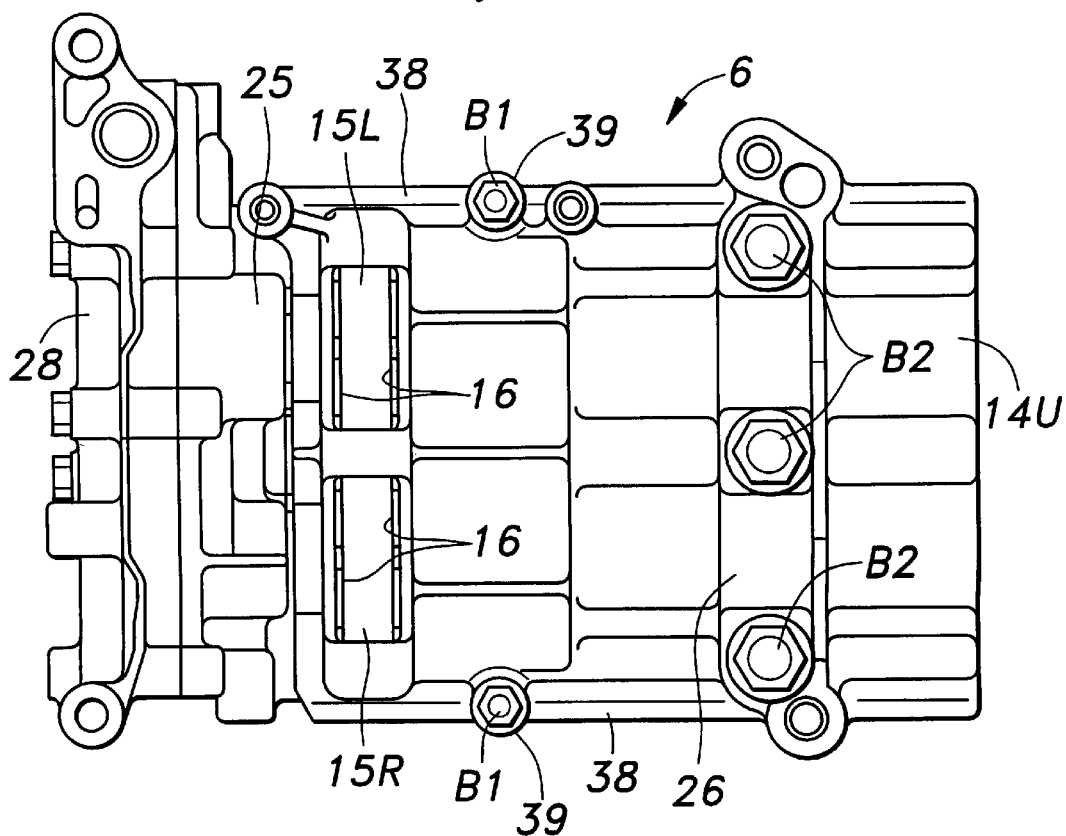
FIG. 8 is a plan view of the balancing device.

A ledge-like projection 38 axially extends along each lateral side of the housing upper half 14U. These ledge-like projections 38 oppose the open ends of the corresponding gaps 37, and prevent lubricating oil that may drip from above from entering the interior of the housing 14. These ledge-like projections 38 extend along either side of the housing upper half 14 over the entire length thereof as illustrated in FIGS. 7 and 8, and connect boss portions 39 for receiving threaded bolts B1 fastening the upper and lower halves 14U and 14L of the balancer housing 14 together, the first bearing wall portions 26, and the thrust bearing wall portions 16 for abutting the helical gears 15L and 15R which are integrally attached to the corresponding balance shafts 13L and 13R. The ledge-like projections 38 thus contribute to increasing the rigidity of the balancer housing 14.

The upper and lower halves 14U and 14L of the balancer housing 14 are additionally fastened together by three threaded bolts B2 arranged laterally along the first bearing wall portions 26 for supporting the first journal portion 18 so that the first bearing wall portion 26 may be kept free from any play even when subjected to the radial acceleration due to the rotation of the counter weights 19.

Figure 9:
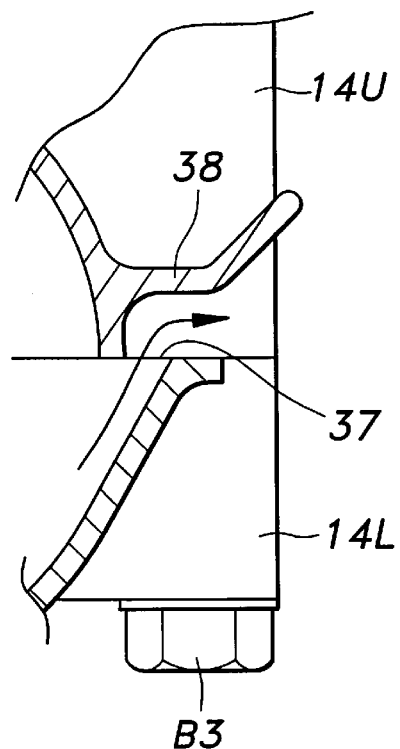
FIG. 9 is a fragmentary longitudinal sectional view showing a modified embodiment of the ledge-shaped projections.

The ledge-shaped projections 38 may be each extended to a desired length in lateral direction and provided with a desired cross sectional shape as illustrated in FIG. 9 so that they can be given with the function of baffle plates for preventing the disturbances in the surface of the oil in the oil pan.

Figure 10:
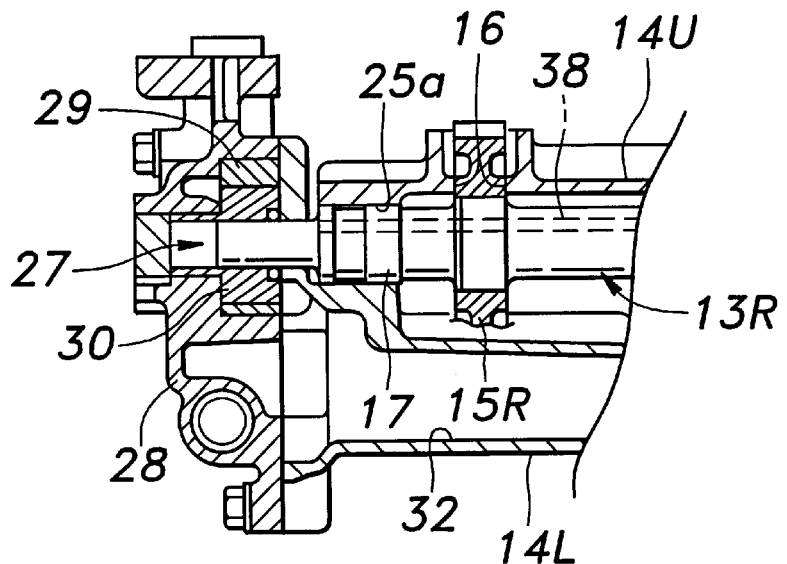
FIG. 10 is a fragmentary longitudinal sectional view showing a modified embodiment of the balancer housing.

Referring to FIG. 10, the bearing bore 17a for supporting the second journal portion 17 may be formed in the parting plane between the upper and lower halves 14U and 14L of the balancer housing 14. According to this arrangement, because the common parting plane may be used for defining the bearings for both the first and second journal portions 18 and 19, the relative positional precision between the axial centers of the bearings can be improved.

Figure 12:
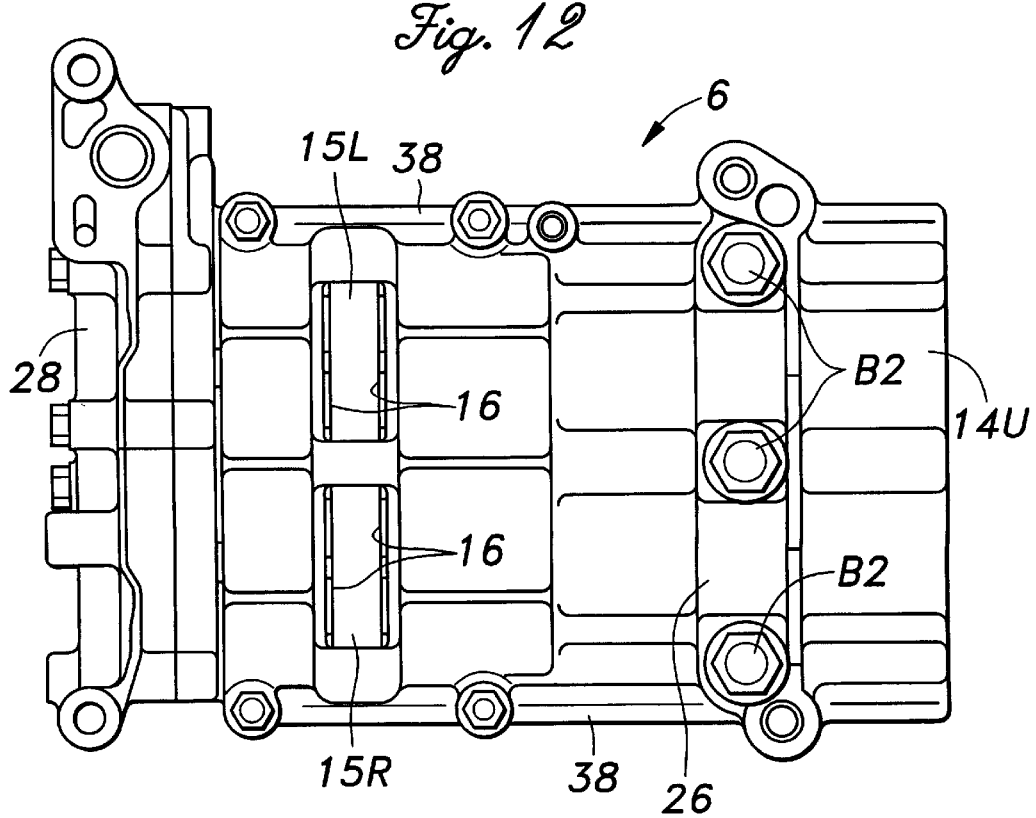
FIG. 12 is a plan view of the alternate embodiment of the balancing device.
Figure 11:
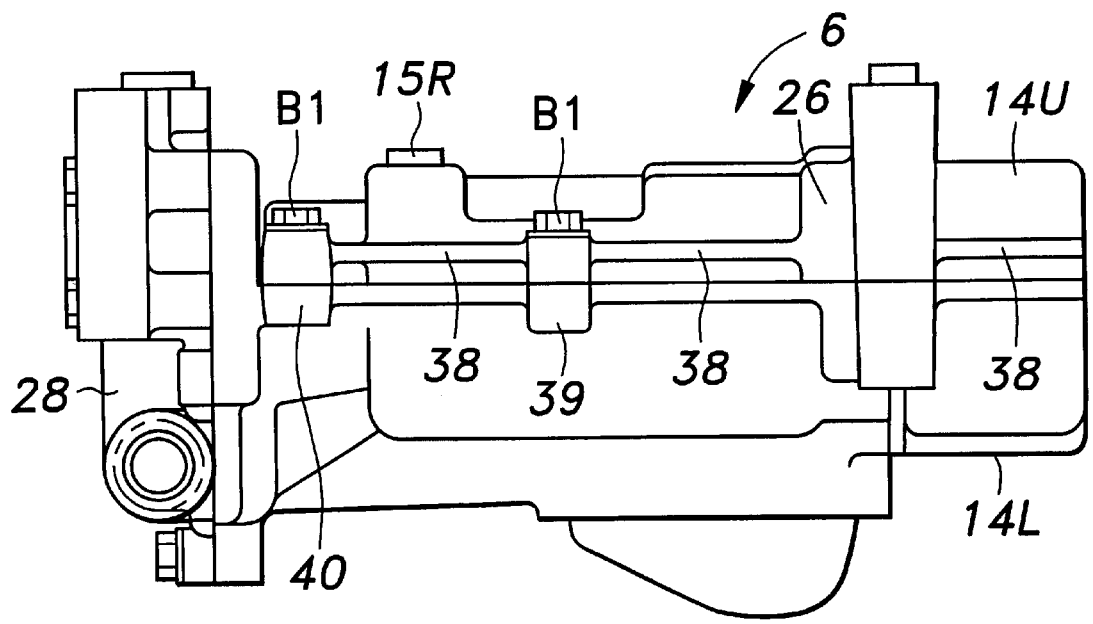
FIG. 11 is a right side view of an alternate embodiment of the balancing device.

By providing additional boss portions 40 receiving threaded bolts B1 for fastening the upper and lower halves 14U and 14L of the balancer housing 14 together in the area adjacent to the second bearing wall portion 17 and extending the ledge-shaped projections 38 up to the additional boss portions 40 as shown in FIGS. 11 and 12, the bearing wall portions in the front and rear ends can be connected to each other with the ledge-shaped projections 38, and the rigidity of the front and rear bearing wall portions can be increased even further.

The balancing device 6 having the above described structure can be attached to the lower block 5 by threaded bolts B3 passed through the two halves of the balancer housing 14 from below as illustrated in FIG. 4.

Figure 13:
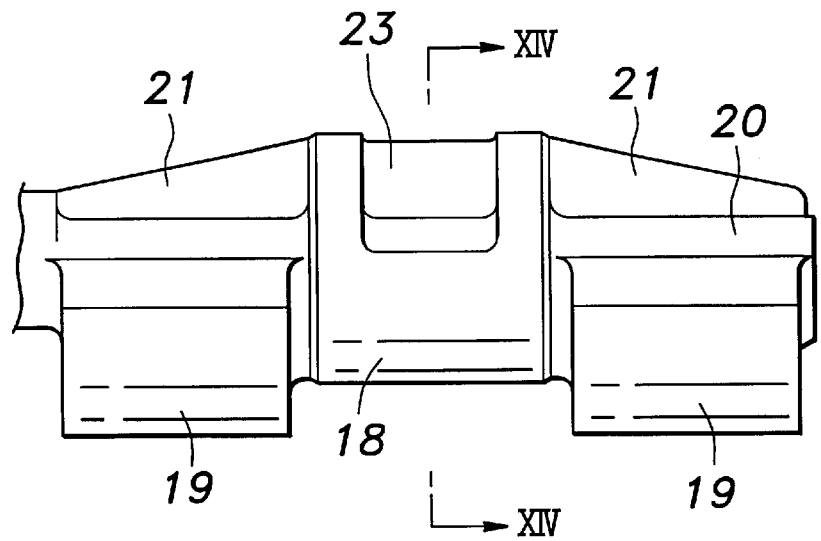
FIG. 13 is a side view of a second embodiment of the balance shaft according to the present invention.
Figure 14:
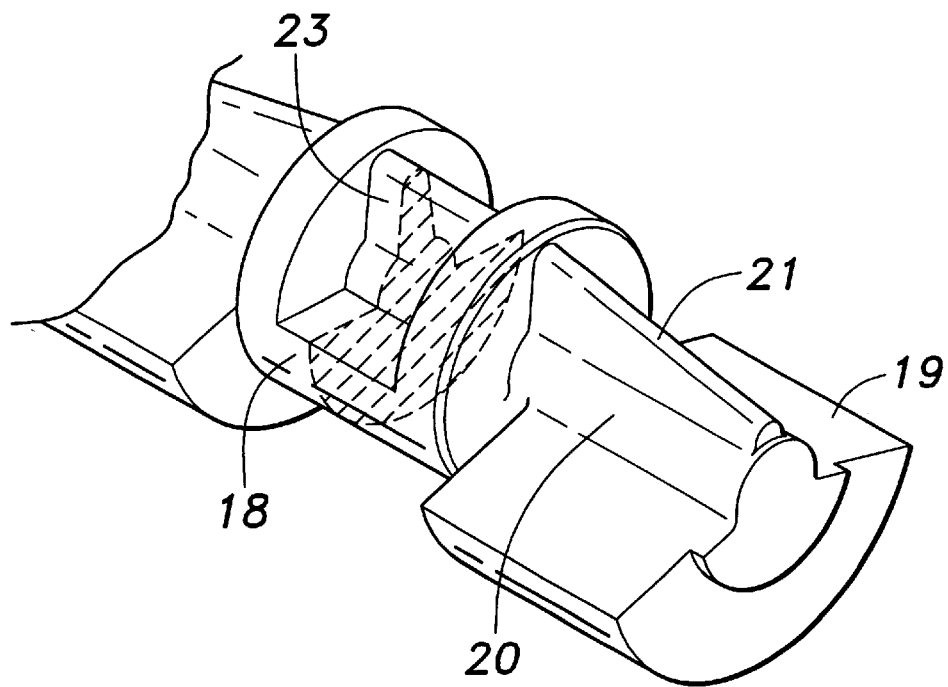
FIG. 14 is a perspective view of the balance shaft show in FIG. 13.

FIGS. 13 to 14 show a second embodiment of the balance shaft embodying the present invention. The parts corresponding to those of the previous embodiment are denoted with like numerals. This embodiment is different from the previous embodiment in the shape of the rib 23 which extends across the recess formed in the first journal portion 18 between the two axial ends thereof. In this embodiment, the outer edge of the rib 23 is somewhat recessed from the outer profile of the first journal portion 18, in particular the two axial ends thereof, and is rounded. The rib 23 is not provided with a through hole as opposed to the previous embodiment.

Because the outer edge of the rib 23 is recessed and rounded, it receives less resistance from the lubricating oil as it rotates with the rest of the balance shaft. Also, recessing the outer edge of the rib 23 eliminates the need for a high precision because it is not required to conform to the outer profile of the remaining part of the first journal portion 18.

Although the present invention has been described in terms of preferred embodiments thereof, it is obvious to a person skilled in the art that various alterations and modifications are possible without departing from the scope of the present invention which is set forth in the appended claims.

What is claimed is:

1. A balance shaft for an engine balancing system for canceling an unbalance force of an engine, comprising:
   an counter weight portion having a gravitational center offset from a rotational center thereof; and
   a journal portion for rotatably supporting said balance shaft in a bearing bore defined in a fixed part of said engine;
   said journal portion being provided with a recess on a side remote from said gravitational center of said counter weight, a full circular part on each axial end thereof, and a first rib extending across said recess axially along a radial plane between said full circular axial end portions of said journal portion.

2. A balance shaft according to claim 1, wherein said counter weight portion comprises a radially offset lobe, and a second rib extends axially along a radial plane on a side of said balance shaft diagonally opposite said lobe.

3. A balance shaft according to claim 2, wherein said first and second ribs extend along a common radial plane and merge at one of said full circular axial end portions.

4. A balance shaft according to claim 1, wherein said first rib is provided with an outer profile which is recessed radially inward with respect to an outer profile of said full circular part of said journal portion.

5. A balance shaft according to claim 4, wherein said outer profile of said first rib is defined by a rounded edge.

6. A balance shaft according to claim 1, wherein said first rib is provided with an outer profile which is common to an outer profile of said full circular part of said journal portion.

7. A balance shaft according to claim 1, wherein said first rib is provided with an opening passed therethrough.

8. A balance shaft according to claim 7, wherein said opening is formed in a part of said rib adjacent to an axial center of said balance shaft.

9. A balance shaft according to claim 2, wherein said second rib extends substantially over an entire length of said counter weight portion.

10. A balance shaft according to claim 2, wherein said second rib is provided with a radial height which progressively diminishes away from the journal portion.

11. A balance shaft according to claim 1, wherein said counter weight portion is provided on each axial end of said journal portion.

12. A balance shaft according to claim 11, further comprising a gear attached thereto at a part adjacent to an end of one of the counter weight portion remote from the journal portion, and a second journal portion on an axial side of the gear remote from the counter weight portion.

13. A balance shaft according to claim 1, wherein said journal portion has a substantially smaller rotational diameter than said counter weight portion.

* * * * *